United States Patent Office 2,898,305
Patented Aug. 4, 1959

2,898,305

PREPARATION OF SILICA-BASED CATALYSTS

John W. Teter, Chicago, John L. Gring, Homewood, and Henry Erickson, Park Forest, Ill., assignors to Sinclair Refining Company, New York, N.Y., a corporation of Maine No Drawing. Application January 17, 1956
Serial No. 559,527

8 Claims. (Cl. 252—455)

This invention relates to an improved method for manufacturing silica-based catalysts which are useful in various reactions including hydrocarbon conversion reactions, particularly the hydrocracking of petroleum residuals or their separate fractions.

There have been a number of methods described for preparing silica-based catalysts. Silica particles in undried form or after partial or complete drying or even after calcination have been impregnated with aqueous salt solutions to add one or more components which will enhance catalytic activity. Frequently a dried or calcined silica is impregnated with a solution of one component, re-dried, impregnated a second time to increase the percentage of the component or to introduce a second component, and again dried. Even more than two impregnations are sometimes used. These methods have disadvantages. For instance, the water-soluble salts employed are frequently expensive as compared with the cost of salts of low water solubility which, due to their solubility characteristics, generally fined less uses in the chemical industry. Frequently the soluble salt is in the form of a nitrate and upon subsequent heating of the dried material noxious and corrosive nitrogen compounds are evolved which necessitate special equipment and represent a potential hazard to personnel.

Other anions introduced through use of the water-soluble catalytically active metal salts are equally disadvantageous. For example, chloride can be deleterious as it causes corrosion of processing equipment. To avoid these effects, operators have employed expensive and time-consuming washing operations to reduce the anion content. Also multiple impregnations, indicated above, require multiple dryings, thereby slowing production and increasing processing costs. Additions by impregnation may also result in higher percentage of components on some particles as compared to others.

When the catalytically active component is incorporated into the silica structure by precipitation, various reagents have been employed as precipitants. Invariably these extraneous agents include undesirable catalyst constituents. For example, if a basic precipitant be employed, such as sodium hydroxide, sodium ions are introduced which may poison the catalyst, while if an acidic precipitant be used the undesirable anions are present. Unless contaminating ions are subject to removal by heating during calcination washing procedures are usually employed; however, it is sometimes difficult to wash without also partially removing a desired component.

In another method of preparing these catalysts precipitation of the silica base and of the catalytically active component is effected simultaneously. This method is as equally disadvantageous as those employing a preformed base and water-soluble salts, since the undesirable and poisoning cations and anions are again introduced which necessitates considerable water washing. Thus, all of these methods of preparing silica-based catalysts are disadvantageous in that they require relatively expensive reagents, extensive water washing, and complicated processing equipment which in many instances must be specifically designed for the particular catalyst manufactured.

In the present invention it has been found that valuable silica-based catalysts comprised predominantly of silica and containing certain catalytically active components can be prepared from compounds of the catalytically active metal which are normally considered to be substantially water-insoluble. Due to the solubility characteristics of these compounds, they are normally less expensive by an appreciable factor and may be commercially available as process by-products. In this invention the substantially water-insoluble compounds are agitated in an aqueous medium with a silica base until the desired constituents have essentially been absorbed or interacted with the catalyst base. The catalytically active components which are deposited on the silica base include metals of the iron transition group, i.e. cobalt, nickel and iron; the metals of the fifth and sixth periods of group VI$a$, i.e. molybdenum and tungsten; vanadium and their various combinations. It is believed that the small but finite solubility of the substantially water-insoluble compounds of these metals provides effective transfer of the added component to the base material as X-ray and microscopical inspections of the resulting catalysts indicate combination of the catalytically active component with the base apparently through some reaction mechanism. As the substantially water-insoluble salts are usually inorganic and offered as the carbonate, oxide, hydroxide or sulfide, undesirable extraneous ions are not introduced in the catalyst and thus little or no washing is necessary after impregnation of the base with the catalytically active component. Usable forms of these salts also include the bicarbonates, basic carbonates and hydrated oxides. When employing sulfides it can be advantageous to add a small amount of ammonia to the digestion mixture.

The catalyst can be made as, for instance, by agitating the silica base and the substantially water-insoluble compounds of the catalytically active component in an aqueous medium for a time sufficient to effect transfer of an effective amount of the catalytic component to the base followed by separation of solids, drying and calcination. Temperatures suitable for calcination are usually in the range from about 800° to 1200° F. The composited base can be formed as by tabletting or extruding as practiced in the art. Also, when the catalysts are to be used in fluid processing, they can be employed in the finely divided form. It is seen that the present invention is directed to a process for manufacturing catalysts which employs relatively inexpensive chemical reagents and simplified processing steps materially reducing washing requirements which is adaptable to the manufacture of a variety of catalysts.

In the present method the silica base which is stirred in the aqueous medium is in particle form or the gelatinous hydrogel form. Thus the base can be in the form of dried or undried silica hydrate or silica hydrogel in gelatinous hydrogel form or dried sufficiently to afford discrete particles, or the silica can be calcined as to a moderate degree before interacting with the catalytically useful constituent or constituents. When particulate, the useful size of the base particles can vary. Finely divided particles such as spray dried microspheres are preferred as they present large surface areas for deposition of the catalytically active component.

In the hydrocracking of petroleum residuals such as vacuum still bottoms or maltenes obtained therefrom as by pentane precipitation of asphaltenes, it is desirable to employ catalysts comprising the activating metal deposited on a silica base of increased acidity. Our method is particularly advantageous when employing a silica base of increased acidity derived from the inclusion of a minor amount of alumina, magnesia or other acidic components such as titania, zirconia, thoria, fluoride, boria, etc. The acidic component can be up to about 40 weight percent of the supporting base and usually at least 0.5% is added. When employing alumina or magnesia as the acidic components at least about 20% is usually added. We prefer from about 25 to about 35% of alumina and from about 25 to about 40% of magnesia. When desired the acidic components can be combined, for instance, alumina and magnesia can be used together, with their added weight preferably comprising about 20 to about 40 weight percent of the total supporting base. Also, the aqueous medium for the silica base and the catalytically active component can contain when desired minor amounts of non-aqueous constituents as, for instance, alcohols. Mother liquor separated from the impregnated silica can be reused in slurrying additional base and metal compounds particularly to reduce loss of ions of the catalytically active component.

The catalytically active components which are deposited on the silica base include metals of the iron transition group, i.e. cobalt, nickel and iron; the metals of the fifth and sixth periods of group VIa, i.e. molybdenum and tungsten; vanadium and their various combinations. As noted the catalytic component is deposited on the base through agitation in an aqueous medium of substantially water-insoluble metal salts which have a small but finite water-solubility, preferably inorganic salts such as the carbonates, basic carbonates, hydroxides and oxides are employed. The added component on the base will be an amount sufficient to afford a substantial catalytic effect and will frequently comprise about 0.1 to 10 weight percent of the catalyst, but may be up to about 30 weight percent or more of the total catalyst composition. Also the catalytically active metals can be deposited in some sulfide form in the manufacturing procedure or sulfiding can be effected after the active component is deposited on the base material to produce hydrogenation catalysts.

As previously noted, the silica base and the substantially water-insoluble compound of the catalytically active component are agitated in the aqueous medium for a time sufficient to effect deposition of the base of an amount of metal component which affords a substantial catalytic effect. The time necessary to give this result can depend upon the material being deposited as well as the conditions of agitation, such as the temperature at which the slurry is digested, and in general will be at least about ten minutes. While the slurry is digesting, it is stirred and preferably is at a temperature from about 125° to about 190° F. or to about 212° F. which affords more effective deposition of the active component on the base. Higher temperatures, even above 212° F., could be employed; however, no particular advantage is associated with their utilization which overcomes the necessity for employing super-atmospheric pressures to maintain the slurry by keeping the water in the liquid phase. Lower temperatures such as room temperature and somewhat below can also be employed, for instance cobalt and molybdenum are effectively deposited on the silica base when cobalt carbonate, molybdenum trioxide and the base are digested at room temperature in the aqueous slurry with agitation for six hours. When cobalt or nickel carbonate alone is slurried with the base under the same conditions in the absence of molybdenum trioxide, deposition of cobalt on the base is very slow. On the other hand, cobalt can be deposited on the base in a more feasible digestion time even in the absence of molybdenum trioxide when the temperature is elevated, e.g. 160° F. Thus, the selection of digestion conditions will depend upon several factors.

As indicated the catalysts prepared by our method are useful in hydrocracking petroleum residuals or their separate components such as maltenes. The conditions of reaction are those used in the art and generally include temperatures of about 650° F. to 950° F., pressures of about 400 to 4000 p.s.i.g., space velocities of about 0.3 to 4.0 WHSV (weight of feed per weight of catalyst per hour) and about 1000 to 10,000 standard cubic feet of hydrogen per barrel of hydrocarbon feed. The reaction system may be of any type such as fixed bed, slurry, fluid, etc. Also, the catalysts can be regenerated periodically during use by treatment with an oxygen-containing gas at elevated temperature, e.g. air at 900° F., to remove carbon.

The following specific examples will serve to illustrate the present invention; however, they should not be considered as limiting.

*Example I*

A three-necked round bottomed flask was fitted with a heating mantle, thermometer, stirrer, and water-cooled condenser. One liter of water was added to the flask and stirring and heating were started. To the water were added 613 grams of Nalco "high alumina" fluid silica-alumina cracking catalyst (surface area of about 450 square meters/gram, calculated on the ignited basis, and containing approximately 22% by weight of $Al_2O_3$ and 23.63 weight percent volatile matter at 1850° F.). The temperature of the resulting slurry was brought to 160° F. To the heated slurry were added 50.5 grams of nickel carbonate and stirring was continued for 6 hours at 160° F. Microscopic examination of samples from the slurry indicated interaction of the nickel and silica components. The mother liquor was then filtered from the solid phase and the filtrate was nearly colorless. The filter cake was dried at 230° F. The dried solids were mixed with Sterotex die lubricant and tableted to 1/16″ x 1/16″ size. The tablets were calcined for 6 hours in air at 1200° F. in an electric muffle furnace which was brought to calcination temperature from room temperature in one hour.

*Example II*

To a reaction flask as fitted in Example I were added 1200 ml. of water and stirring and heating were started. 575 grams of Nalco cracking catalyst employed in Example I, 39.9 grams of cobalt carbonate, and 49.5 grams of molybdenum trioxide (A.R. grade) were added and the temperature of the resulting slurry brought to 160° F. Heating and stirring of the slurry were continued for 6 hours at 160° F. The mother liquor was filtered from the solid phase and the filter cake was oven dried at 230° F. The oven dried filter cake was mixed with Sterotex die lubricant, tableted to 1/8″ x 1/8″ size and calcined for 6 hours in air at 1050° F. in an electric muffle furnace which was brought to calcination temperature in 3 hours. The resulting catalyst analyzed (ignited basis) 2.99 weight percent cobalt, 9.22 weight percent $MoO_3$, 0.085 weight percent sodium, and 1.38 weight percent V.M. at 1200° F.

*Example III*

To a flask as fitted in Example I was added 1 liter of water and stirring and heating were started. 524 grams of Nalco cracking catalyst of Example I, 19.6 grams of nickel carbonate and 85.6 grams of tungstic acid ($WO_3 \cdot H_2O$) were added, and the temperature of the resulting slurry was brought to 160° F. The slurry was stirred for 6 hours while maintained at a temperature of 160° F. Microscopic examination of samples from the slurry indicated interaction of silica and metal components. The mother liquor was then filtered from the solid phase and the solid filter cake was oven dried at 230° F. The dried filter cake was mixed with Sterotex die lubricant, tableted to 1/16″ x 1/16″ size, and calcined for 6 hours in air at 1200° F. in an electric muffle furnace which was brought to calcination temperature in 1 hour.

*Example IV*

1730 grams of Davison silica hydrogen (468 grams $SiO_2$) were disintegrated in one liter of water in a Waring Blendor. The resulting material was added to a flask as fitted in Example I and stirring and heating were conducted until the temperature of the material was 160° F. 50.6 grams of nickel carbonate were added and upon thickening of the slurry another liter of water was combined with the slurry. Stirring of the resulting slurry was continued for 6 hours at 160° F. Microscopic examination of samples of the slurry indicated interaction of the nickel and silica components. The mother liquor was then filtered from the solid phase and the filter cake was oven dried at 230° F. The filtrate appeared colorless and a trace of nickel was indicated by dimethylglyoxime. The filter cake can be dried, mixed with Sterotex die lubricant, tableted to 1/8" x 1/8" size and calcined for 6 hours in air at 1200° F. in an electric muffle furnace as in Example III.

*Example V*

To a flask as fitted in Example I were added 3 liters of water and 1515 grams of Nalco cracking catalyst of Example I and stirring and heating were started. 151.5 grams of nickel carbonate and 232 grams of $V_2O_5$ were also added to the flask and the resulting slurry was brought to 160° F. with stirring and $CO_2$ evolved vigorously. Stirring of the slurry was continued for 6 hours at 160° F. at which time no $NiCO_3$ was visible but a few large particles of $V_2O_5$ appeared. Digestion continued for 17 hours at which time no $V_2O_5$ was visible. The mother liquor was then filtered from the solid phase and the filter cake was oven dried at 230° F. The dried filter cake was mixed with 4% of Sterotex die lubricant, tableted to 1/16" x 1/16" size, and calcined for 6 hours in air at 900° F. in an electric muffle furnace which was brought to calcination temperature in 3 hours.

*Example VI*

To a flask as fitted in Example I were added 1 liter of water and 468 grams of regenerated equilibrium Filtrol silica-alumina (about 12% alumina) cracking catalyst and stirring and heating were conducted until the temperature was 160° F. 50.6 grams of nickel carbonate were added to the flask. Stirring was continued for 6 hours with the slurry at 160° F. The mother liquor was filtered from the solid phase and the filter cake was oven dried at 230° F. The filtrate was very slightly colored and the filter cake was very dark. This catalyst is useful in a slurry system for hydrocracking maltenes. Also, this preparation illustrates the usefulness of the present invention in depositing the catalytically active components on a calcined base.

*Example VII*

To a flask as fitted in Example I were added 1500 ml. of water and 535 grams of oven dried silica-magnesia composition containing 30 weight percent MgO (469 grams dry basis) and heating and stirring were conducted until the temperature was 160° F. 27.2 grams of cobalt carbonate and 45 grams of molybdenum trioxide were added and stirring of the slurry was continued for 6 hours. The mother liquor was then filtered from the solid phase and the filter cake was oven dried at 230° F. The filtrate was colorless. The dried filter cake was mixed with 4% of Sterotex die lubricant, tableted to 1/16" x 1/16" size, and calcined for 6 hours in air at 900° F. in an electric muffle furnace which was brought to calcination temperature in 3 hours. The resulting catalyst analyzed (ignited basis) 2.26 weight percent cobalt, 4.77 weight percent $MoO_3$, 26.5 weight percent MgO and 1.61 weight percent V.M. at 1200° F. The catalyst had a surface area (BET) of 548 square meters per gram, calculated on an ignited basis.

*Example VIII*

To a flask as fitted in Example I were added 1250 ml. of water and 456 grams of $SiO_2 \cdot MgO$ base of Example VII and stirring and heating were conducted until the temperature was 160° F. 19.6 grams of nickel carbonate and 85.6 grams of tungstic acid ($WO_3 \cdot H_2O$) were added. Stirring was continued for 6 hours with the slurry at 160° F. The mother liquor was then filtered from the solid phase and the filter cake was oven dried at 230° F. The dried filter cake was mixed with 4% of Sterotex die lubricant, tableted to 1/16" x 1/16" size, and calcined for 6 hours in air at 1200° F. in an electric muffle furnace which was brought to calcination temperature in 1 hour. The resulting catalyst analyzed (ignited basis) 2.08 weight percent nickel, 10.35 weight percent $WO_3$, 26.2 weight percent MgO, and 2.52 weight percent V.M. at 1200° F.

*Example IX*

102 pounds of Nalco fluid silica-alumina cracking catalyst containing 26.8% $Al_2O_3$ and equivalent to 91.8 pounds dry basis, were slurried in a jacketed stainless steel kettle in 23 gal. $H_2O$. The slurry was heated to 140° F. and 9.41 pounds of $MoO_3$ were added. The slurry was then heated to 160° F. and 6.41 pounds of cobalt carbonate (43.6% Co) were added. The temperature was raised to 180° F. in 55 minutes. At this time no particles of undissolved $MoO_3$ or cobalt carbonate were visible under a microscope. The slurry was held at 180° F. for 65 minutes. The heat was shut off but stirring was continued during the period (1¾ hrs.) required for filtration. The filter cake was dried at 230° F. and ground. The ground product was calcined in air at 1000–1070° F. for 10 hours. The system was purged with nitrogen and the product was reduced with hydrogen at 920 to 950° F. The reduced product was sulfided with a mixture of hydrogen and hydrogen sulfide at 915 to 940° F. The sulfided catalyst analyzed (ignited basis) 2.38 weight percent cobalt, 8.70 weight percent $MoO_3$, total sulfur 3.89 weight percent and 2.35 weight percent volatile matter at 1200° F. The catalyst surface area (BET) was 359 square meters per gram (ignited basis).

*Example X*

To a reaction flask as fitted in Example I were added 1200 ml. of water and stirring was started. 575 grams of Nalco cracking catalyst employed in Example I, 39.9 grams of cobalt carbonate, and 49.5 grams of molybdenum trioxide (A.R. grade) were added and stirring of the slurry was continued for 1 hour at room temperature. Subsequent inspection of the mother liquor under the microscope did not reveal any substantial amount of undissolved promoter materials. The mother liquid is filtered from the solid phase and the filter cake is oven dried at 230° F. The oven dried filter cake is mixed with Sterotex die lubricant, tableted to 1/8" x 1/8" size and calcined for 6 hours in air at 1050° F. in an electric muffle furnace which is brought to calcination temperature in 3 hours.

It is claimed:

1. In a method of catalyst manufacturing, the steps which comprise agitating a material selected from the group consisting of silica and silica containing minor amounts of acidic components in an essentially aqueous slurry medium with at least one substantially water-insoluble inorganic compound selected from the group consisting of the carbonates, oxides and hydroxides of the iron transition group metals, molybdenum, tungsten, and vanadium to deposit said metals on the silica, separating solids from the aqueous medium, drying the separated solids, and calcining the dried material.

2. The method of claim 1 in which the material is silica containing a minor amount not over about 40 percent of a member selected from the group consisting of alumina and magnesia.

3. The method of claim 1 in which the silica is particulate and finely divided and the solids are formed into larger particles after drying and before calcining.

4. The method of claim 1 in which the agitation is conducted at a temperature from about 125° to about 212° F.

5. The method of claim 1 in which the substantially water-insoluble compound selected from the group consisting of the carbonates, oxides and hydroxides of the iron transition group metals, molybdenum, tungsten and vanadium, is a combination of (1) an iron transition group metal compound and (2) a compound of a metal selected from the group consisting of molybdenum, tungsten and vanadium, said compounds being selected from the group consisting of carbonates, oxides and hydroxides.

6. The method of claim 5 in which the agitation is conducted at a temperature from about 125° to about 212° F.

7. The method of claim 2 in which substantially water-insoluble compounds of cobalt and molybdenum are agitated in the aqueous medium.

8. The method of claim 7 in which cobalt carbonate and molybdenum trioxide are employed.

References Cited in the file of this patent

UNITED STATES PATENTS

| | | |
|---|---|---|
| 2,120,958 | Coons | June 24, 1932 |
| 2,429,855 | Teter | Oct. 28, 1947 |
| 2,433,614 | Longley | Dec. 30, 1947 |
| 2,455,713 | Voorhies | Dec. 7, 1948 |
| 2,472,833 | Hunter et al. | June 14, 1949 |
| 2,519,099 | Bailey et al. | Aug. 15, 1950 |
| 2,573,726 | Porter et al. | Nov. 6, 1951 |
| 2,606,940 | Bailey et al. | Aug. 12, 1952 |
| 2,699,430 | Teter | Jan. 11, 1955 |
| 2,731,439 | Jones et al. | Jan. 17, 1956 |